(12) United States Patent
Orleskie

(10) Patent No.: US 7,281,436 B1
(45) Date of Patent: Oct. 16, 2007

(54) WEDGE FLOW METER WITH CONDITIONER

(75) Inventor: Charles T. Orleskie, Berthoud, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 11/487,097

(22) Filed: Jul. 17, 2006

(51) Int. Cl.
*G01F 1/37* (2006.01)

(52) U.S. Cl. .................................. 73/861.52
(58) Field of Classification Search ............. 73/861.52, 73/861.63
See application file for complete search history.

(56) References Cited

U.S. PATENT DOCUMENTS 3,355,946 A * 12/1967 Lazell ..................... 73/861.65
4,237,739 A * 12/1980 Owen et al. ............. 73/861.63

* cited by examiner

*Primary Examiner*—Jewel Thompson
(74) *Attorney, Agent, or Firm*—Richard W. Hanes; January D. Barrett; Hanes & Schutz, LLC

(57) ABSTRACT

A primary flow measuring element comprising a cylindrical body having an axis and an interior surface defining a fluid flow path and having at least one differential pressure producing segmental wedge attached to the interior surface of the cylindrical body with high and low pressure sensing ports disposed in said cylindrical body on the upstream and downstream sides of the at least one segmental wedge respectively and having at least one conditioning segmental wedge attached to the interior surface of the cylindrical body at a position upstream from the at least one differential pressure producing segmental wedge.

10 Claims, 2 Drawing Sheets

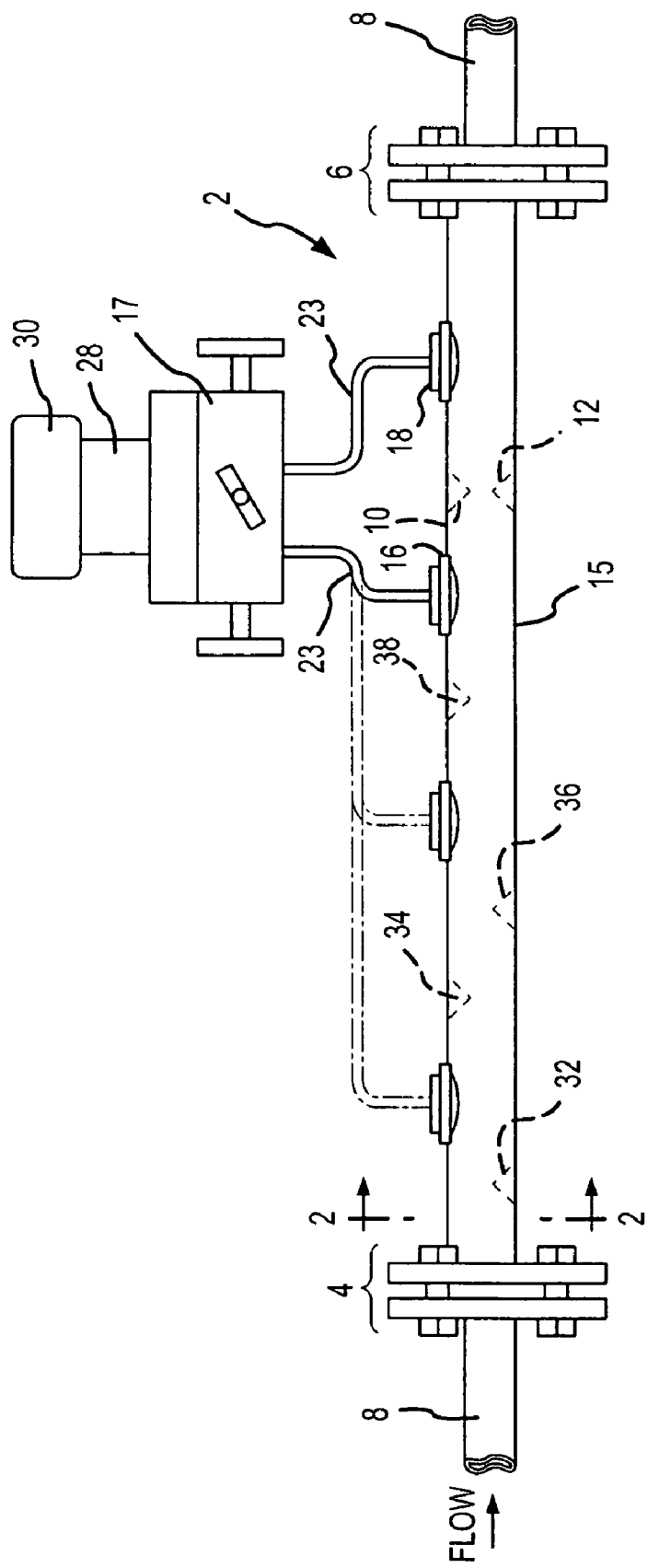
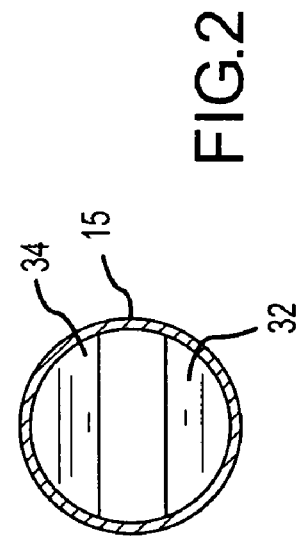

WEDGE FLOW METER WITH CONDITIONER

FIELD OF THE INVENTION

The present invention relates to a material flow meter that utilizes one or more segmental wedges to create differential pressure in a section of the flow.

BACKGROUND OF THE INVENTION

Fluid and material flow meters that create a section of differential pressure through the use of diametrically opposed segmental wedges are known. Such devices are disclosed in U.S. Pat. Nos. 4,237,739 and 4,926,698. It is well known that wedge flow meters are particularly adapted for difficult to measure flows such as high viscous fluids, slurries, waste water and fluids with suspended solids. While this type of flow meter has been well accepted for these special applications it suffers from several disadvantages, the foremost of which is the requirement that the flow reaching the differential pressure producing wedge must be undisturbed. That is, flow disturbances caused by pipe elbows, reducers, expanders, valves or similar irregularities must be conditioned by relatively long runs of straight pipe upstream and downstream of the flow meter before the flow meter can deliver accurate results. Depending on the configuration of the irregularity, the straight length of the upstream conduit may have to be ten to fifteen times the pipe diameter and the downstream straight pipe length may have to be up to five times the pipe diameter.

Accordingly, it is the primary purpose of the present invention to provide a primary flow measuring element utilizing a differential pressure producing wedge that incorporates additional upstream devices that condition the flow and eliminate the necessity of providing long conduit lengths ahead of and downstream of the flow element.

SUMMARY OF THE INVENTION

The present invention relates to a primary flow measurement element that is insertable into a fluid or material conducting conduit for creating in the flow a section of differential pressure, whose measurement infers a rate of flow of the fluid or material. The flow measuring element includes a cylindrical body having an interior surface defining a flow path for the fluid or material. At least one differential pressure producing segmental wedge, having a solid structure is attached to the interior surface of the cylindrical body with high and low pressure sensing ports disposed in the body on the upstream and downstream sides of the segmental wedge respectively. The pressure sensing ports are interconnected to appropriate pressure transducers and a transmitter located exteriorly of the cylindrical body.

The improvement to the foregoing flow measurement element is the inclusion in the cylindrical body of at least one flow conditioning segmental wedge attached to the interior surface of the cylindrical body at a position upstream from the one or more differential pressure producing segmental wedges. The at least one conditioning wedge shall be interpreted as one or more pairs of segmental wedges, having a solid structure, upstream from the differential pressure measuring section of the primary flow element. The conditioning segmental wedges act to smooth and condition the flow of fluid and material in order that the differential pressure measurement will achieve the highest possible degree of accuracy.

DESCRIPTION OF THE DRAWINGS

FIG. 1 is a side view of the primary flow element of the present invention shown inserted between two lengths of conduit that carry a fluid or material whose flow rate is to be measured.

FIG. 2 is a cross sectional view taken along lines 2-2 of FIG. 1.

DETAILED DESCRIPTION OF PREFERRED EMBODIMENT

Figure 3:
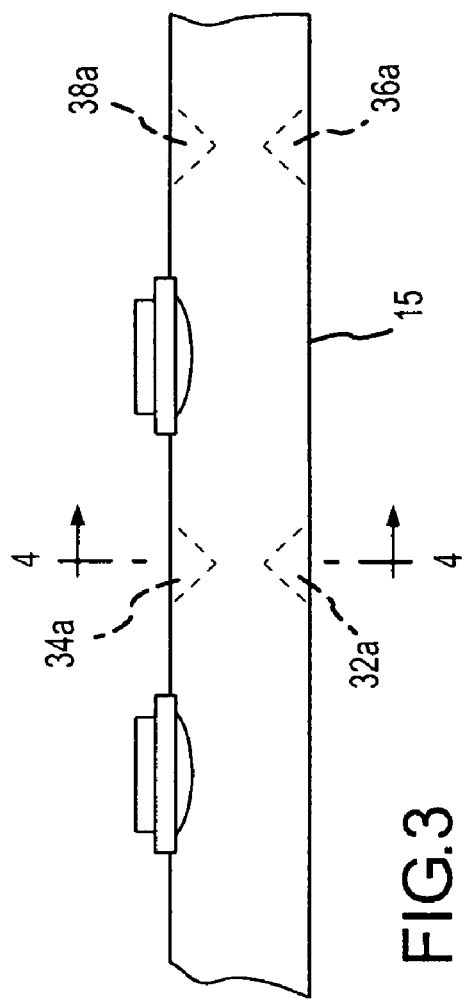
FIG. 3 is a fragmentary side view of the conditioning section of the primary flow element illustrating the configuration of a second embodiment of the conditioning wedges.

Referring first to FIG. 1, the primary flow element of the present invention, shown by reference numeral 2, exists between the flanges 4 and 6 that interconnect the flow measuring element to the ends of separated sections of fluid or material carrying conduit 8. Conventional diametrically opposed differential pressure (dP) creating segmental wedges 10 and 12 are shown attached to the interior surface of a cylindrical body 15. Disposed in the wall of the cylindrical body 15, on either side of the dP wedges, are high and low pressure sensing ports 16 and 18. The ports are interconnected by conduits 23 to a conventional manifold 17 that conducts the pressures in the conduits to a pressure transducer 28. Electrical signals representing the high and low pressures that exist at the respective upstream and downstream sides of the dP wedges 10 and 12 are transmitted by transmitter 30 to an appropriate algorithm computer where the flow rate of the fluid in the conduit 8 is determined by well known methods.

Illustrating the improvement of the present invention, FIG. 1 shows a plurality of segmental conditioning wedges 32, 34, 36 and 38 attached to the interior surface of the cylindrical body 15. Within the short span length of the body of the primary flow element the conditioning wedges smooth and condition the flow of the fluid or material that may be disturbed by contact with upstream pipe elbows, reducers, expanders, valves or other obstructions to regular flow. The presence of the conditioning wedges within the flow element 2 eliminates the necessity of long lengths of straight run pipe upstream of the primary flow element. The conditioning improvement of the present invention allows the primary flow element 2 to be placed in close proximity to a disruptive flow element such as a pipe elbow or the like.

As shown in FIG. 1 the high pressure port may be disposed on the upstream side of the dP wedges 10 and 12 or, in order to improve the signal to noise ratio, placed upstream of the conditioning wedges 38 or 34, as shown by the dotted lines of FIG. 1.

Figure 4:
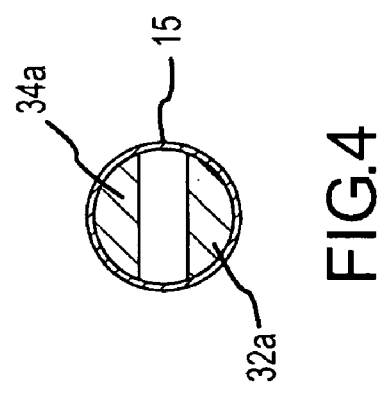
FIG. 4 is a cross sectional view taken along lines 4-4 of FIG. 3.
Figure 5:
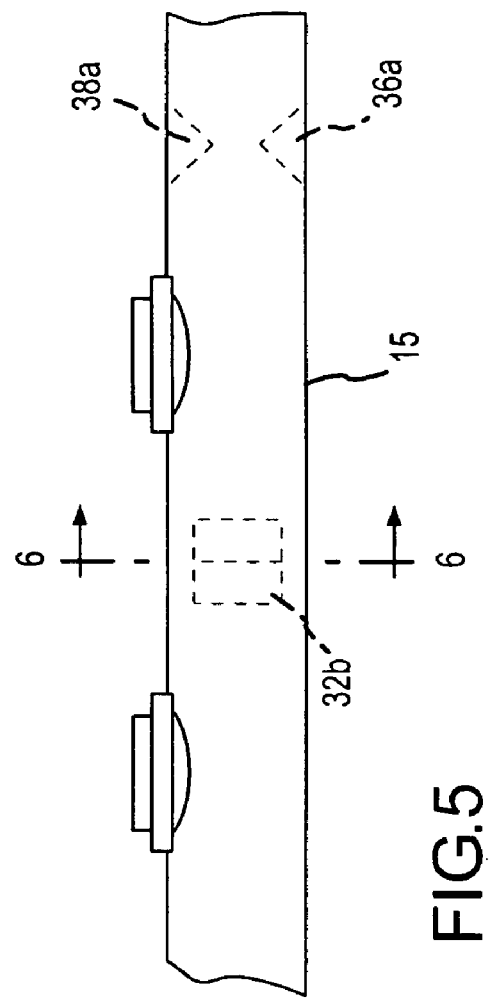
FIG. 5 is a fragmentary side view of the conditioning section of the primary flow element illustrating a third configuration embodiment of the conditioning wedges.
Figure 6:
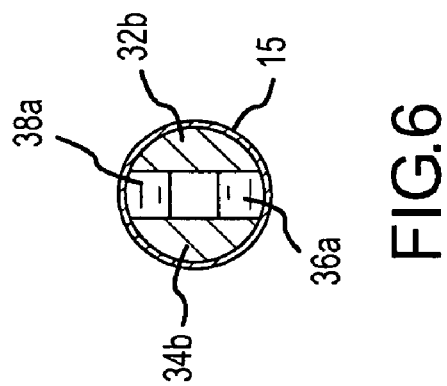
FIG. 6 is a cross sectional view taken along lines 6-6 of FIG. 5.

Additional embodiments of the placement of the conditioning wedges are illustrated in FIGS. 3-6. These configurations are applicable to better condition the flow in high swirl applications. FIGS. 3 and 4 show an embodiment where wedge 32 of FIG. 1 is moved to a location opposite wedge 34, creating a second embodiment utilizing conditioning wedges 34a and 32a. Similarly, wedge 36 (FIG. 1) is moved to a location opposite wedge 38 to employ in the second embodiment conditioning wedges 36*a* and 38*a*. A third embodiment is shown in FIGS. 5 and 6 where the wedges 32*a* and 34*a* are rotated 90° from their position on the inside wall 15 of the flow element in the FIG. 3 embodiment to create conditioning wedges 32*b* and 34*b*.

What is claimed is:

1. A primary flow measurement element comprising,
a cylindrical body having an axis and an interior surface defining a flow path,
at least one differential pressure producing segmental wedge attached to the interior surface of the cylindrical body,
said at least one differential pressure producing segmental wedge having a solid structure,
high and low pressure sensing ports disposed in said cylindrical body on the upstream and downstream sides of the at least one segmental wedge respectively,
at least one conditioning segmental wedge attached to the interior surface of the cylindrical body at a position upstream from the at least one differential pressure producing segmental wedge
said at least one conditioning segmental wedge having a solid structure.

2. The primary flow element of claim 1 where the at least one differential pressure producing segmental wedge comprises first and second segmental wedges circumferentially spaced 180° apart.

3. The primary flow element of claim 2 where the at least one conditioning segmental wedge comprises first aligned upstream and downstream segmental wedges axially spaced apart and having a common axial profile with the first differential pressure producing wedge.

4. The primary flow element of claim 3 where the high pressure port is disposed between the first downstream conditioning segmental wedge and the first differential pressure producing segmental wedge.

5. The primary flow element of claim 3 where the high pressure port is disposed between the first upstream and downstream conditioning segmental wedges.

6. The primary flow element of claim 3 where the high pressure port is disposed upstream of the first upstream conditioning segmental wedge.

7. The primary flow element of claim 2 where the at least one conditioning segmental wedge comprises second aligned upstream and downstream segmental wedges axially spaced apart and having a common axial profile with the second differential pressure producing wedge.

8. The primary flow element of claim 7 where the first and second aligned upstream and downstream conditioning segmental wedges are diametrically aligned.

9. The primary flow element of claim 7 where the first and second aligned upstream and downstream conditioning segmental wedges are diametrically misaligned.

10. The primary flow element of claim 1 where the at least one conditioning segmental wedge comprises first and second diametrically opposed segmental wedges and second diametrically opposed segmental wedges circumferentially oriented 90° to said first diametrically opposed segmental wedges.

* * * * *